Patented Mar. 17, 1936

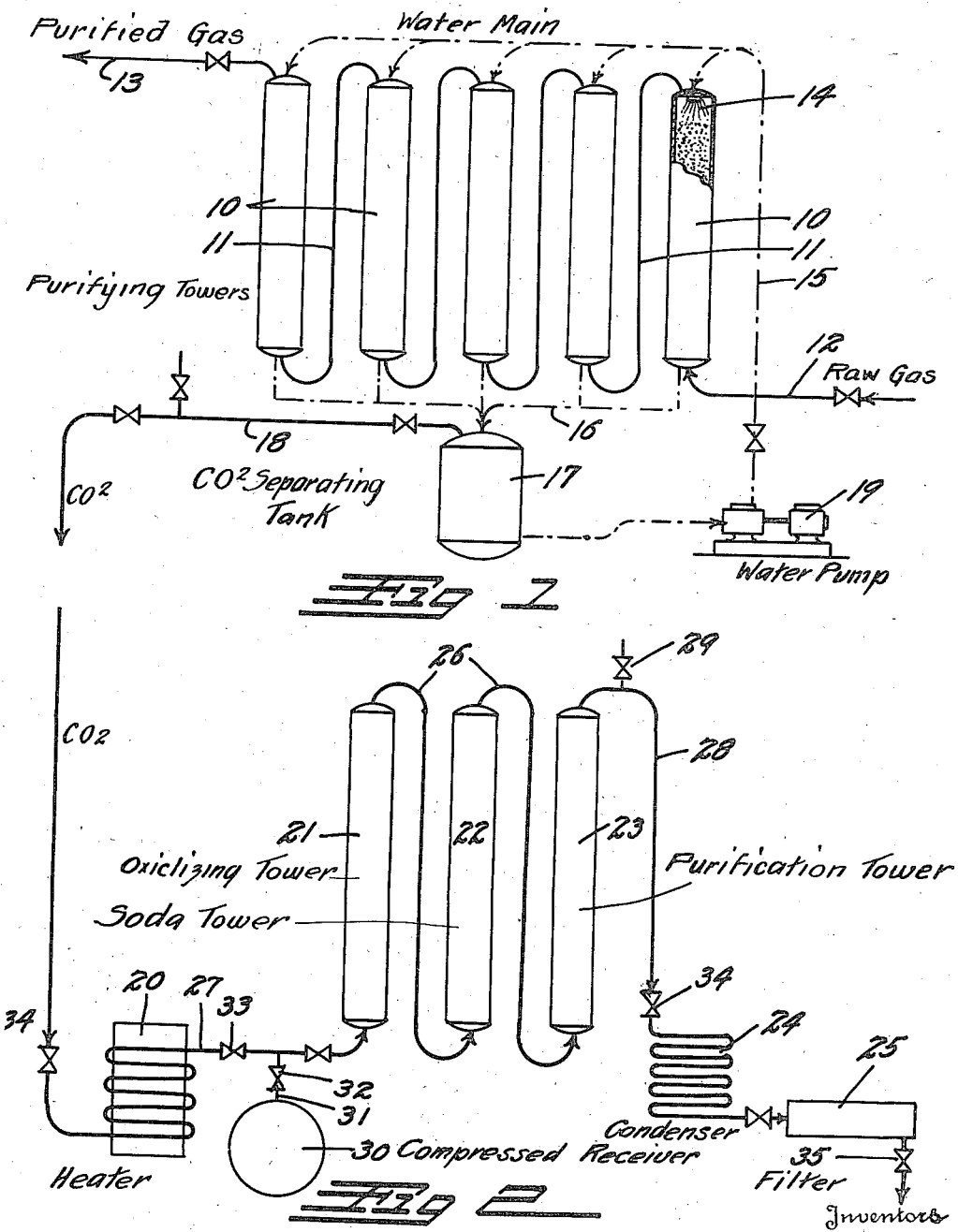

2,033,933

UNITED STATES PATENT OFFICE 2,033,933

PROCESS AND MEANS FOR SEPARATING AND PURIFYING GAS

Frank Goodwin, Seattle, Wash., and E. Ambrose White and Hamilton Perkins Cady, Lawrence, Kans.

Application April 21, 1933, Serial No. 667,166

11 Claims. (Cl. 23—2)

While the present invention relates to the separation and purification of gases in general, it is more particularly applicable to separation of carbon dioxide ($CO_2$) gas from natural gases and the purification of the same.

Many natural gas wells produce a mixed gas consisting mainly of a fuel gas admixed with carbon dioxide in varying proportions. Other wells produce a gas consisting almost entirely of carbon dioxide contaminated with other gases and compounds which render the carbon dioxide unsuitable for commercial uses.

The principal object of this invention is to provide a process, and means for carrying out the process, which will efficiently separate the carbon dioxide from the residual gases and efficiently purify the carbon dioxide so that it will be acceptable for commercial uses.

Another object of the present invention is to provide a process for accomplishing the above and means and materials for carrying out the process which will be economical to use; which will employ readily available raw materials; and which will obtain a maximum delivery from a minimum amount of material.

A further object is to provide means for using water in the separation phase in a more effective manner than it has been heretofore used in the art.

A still further object is to provide means for effectively using air in the purification phase to activate and reactivate the purification reagents so as to not only reduce the cost of refining, but to also increase the effectiveness and efficiency of the process.

Other objects and advantages reside in the process, the steps thereof, and in the materials and means employed. These will become more apparent from the following description in which reference is had to the accompanying drawing forming a part hereof.

In the drawing:

Fig. 1 is a flow diagram illustrating what will be herein designated the "separation phase" of the process.

Fig. 2 is a similar flow diagram illustrating what will be termed the "purification phase" of the process.

If the process is to be employed on a natural gas of a very low carbon dioxide content the "purification phase" might not be commercially advisable in which event the separated carbon dioxide would be allowed to escape to the atmosphere and commercial use made of the residual fuel gas. If employed on a natural gas of very high carbon dioxide content the "separation phase" could be eliminated and the well gas would be passed directly through the "purification phase". On natural gases having commercially sufficient amounts of both gases both phases would, of course, be employed.

Separation phase

The use of water for the separation of carbon dioxide from other gases is of course not new. Heretofore, however, the gases have been bubbled through the water, sometimes with the employment of chemicals in the water intended to increase the absorptive properties of the solution. Such methods are not efficient unless a prohibitive volume or depth of water is used. This is due to the fact that an intimate contact cannot be obtained between the gas and the water since the gas forms balloon-like bubbles, only the gaseous surface of which contact the water. The midportions are entirely out of contact.

In the present process the water is spread in an infinite number of microscopic films on the surfaces of the granules of a granulated or comminuted medium and the gas is compelled to pass through the voids and interstices of a mass of the water coated granules in intimate contact with this multitude of water films. Many mediums may be employed for breaking up the water into an infinite number of films. An ideal medium for this purpose has been found to be activated alumina which has very high absorptive qualities and when moistened to the point of saturation, but not immersed, produces a maximum of absorptive contact. It is believed the smallness of the pores and interstices of a mass of this material together with its excellent absorptive qualities forms an infinite number of infinitely small water membranes or films against which the highly dispersed gas must flow so that an intimate molecular contact is obtained.

The preferred method of carrying out the purification phase is to provide a series of vertical towers 10 filled with granules of the water dispersing medium (such as the activated alumina). The towers 10 are connected in series by suitable series pipes 11. Gas from the well or other supply source is fed to the bottom of the first tower from a well pipe 12 and discharges from the last tower through a fuel gas pipe 13. Water is supplied to a spray nozzle 14 in the top of each tower from a water main 15 and flows from the bottom of each tower through return main 16. The return main empties into a separating tank 17 from whence a carbon dioxide delivery pipe 18 leads. The water from the tank 17 returns to a pump 19 which returns it to the sprays 14.

The water from the sprays constantly washes the water, which has absorbed $CO_2$ from the passing gas, from the dispersion medium to the separating tank 17. While in the towers the water is subjected to the relatively high pressure of the gas therein. When it reaches the tank 17, this pressure is released to a point far below its initial pressure. This causes the water to give up the major portion of its absorbed $CO_2$ to the pipe 18. The returning water retains but a small percentage of the gas. Thus the $CO_2$ gas is effectively and continuously separated from the residual fuel gas flowing through the fuel gas pipe 13.

*Purification phase*

The separated $CO_2$, or the natural $CO_2$, if the separation phase is not required, is not usually suitable for some commercial purposes, such as for carbonating beverages or the manufacture of solid $CO_2$ for use as a refrigerant, owing to contaminating compounds which impart an unpleasant odor or taste and which, in some cases, are highly corrosive. The deleterious substances usually comprise hydro-carbons and other carbon compounds, alcohols, sulfur, hydrogen-sulphide, mercaptans, thioethers and other sulfur compounds.

It has been found that the above objectionable compounds can be effectively and commercially removed by heating the gas and passing it while hot and under pressure through an oxidizing agent containing occluded oxygen or air thence passing it through highly dispersed dry sodium carbonate.

The oxidizing agent is preferably prepared of the following ingredients in the following proportions:—

| | | Ounces |
|---|---|---|
| Ferric oxide | ($Fe_2O_3$) | 27 |
| Ferric chloride | ($FeCl_3$) | 12 |
| Activated alumina | ($Al_2O_3$) | 40 |
| Aluminum chloride | ($AlCl_3$) | 12 |

The ferric oxide is preferably in powdered form like red mineral paint but may be crushed hematite ore. Aluminum in the form of bauxite may be substituted for the activated alumina.

The above is mixed with water to the consistancy of a thick paste and then dehydrated and granulated. The "highly dispersed sodium carbonate" is prepared by coating alumina granules with a thick sodium carbonate solution and then dehydrating to leave each granule coated with dry sodium carbonate. The granules are preferably alumina, crushed bauxite, or silica jell. The coating process is continued until all granules are completely coated with the maximum amount of solution which will mechanically adhere thereto.

The preferred method of carrying out the purification phase is illustrated in Fig. 2 of the drawing. This method contemplates the use of a heater 20, of any desired type suitable for withstanding the necessary pressures and of raising the $CO_2$ gas to a temperature of preferably 450° F.; one or more oxidizing towers 21; one or more soda towers 22; one or more final purification towers 23; a condenser 24; and a filter 25.

The oxidizing tower 21 is filled with the granulated oxidizing agent above described; the soda tower 22 is filled with the coated alumina granules above described; and the final purification tower 23 is preferably, but not necessarily, filled with the same oxidizing agent as tower 21. The condenser 24 may be any suitable heat exchange unit. The filter 25 is preferably of a type employing spun glass or bulk asbestos as a filter medium.

The towers 21, 22 and 23 are connected in series by means of series pipes pipes 26; the heater 20 is connected to the bottom of the first tower 21 by a hot gas pipe 27; controlled by a valve 33; condensers 24 and 25 are connected in series to the top of the final tower 23 by means of a pure gas pipe 28 in which a control valve 34 and a blow-off valve 29 are provided. A compressed air receiver 30 can be connected to the bottom of the first tower 21 through an air pipe 31 and air valve 32. The receiver 30 should be connected to a suitable source preferably capable of supplying aproximately 400 lbs. pressure.

Before turning the gas into the apparatus, air is admitted to the towers through the pipe 31 and valve 32, the valves 33 and 34 being closed. The high pressure of this air compresses it into all of the pores, interstices and voids of the granular, porous materials in the towers. The valve 32 is then closed leaving the tanks under air pressure. $CO_2$ gas is then turned into the heater 20 through a supply valve 34. This gas may come from any source. If from the separating phase it will have to be run through suitable compressors to raise its pressure. If directly from the well, the natural pressure will ordinarily give it an initial pressure of 600 lbs.

The high pressure gas flows from the heater at at least 200° and preferably 450° F., into the first tower 21 where it displaces the free air from the towers through the blow off valve 29, the valve 34 being closed as yet. The valve 29 is closed and the valve 34 is opened when the air has been displaced and gas begins to flow therefrom. The entrapped or occluded high pressure air is locked in the pores and interstices of the oxidizing agent by the still higher pressure of the surrounding gas and remains to assist in and increase the oxidizing action of the oxidation medium per se. The principal oxidizing reactions between the various impurities and the retained air or oxygen are as follows.

(1) Hydrogen sulphide ($H_2S$)
$$2H_2S + O_2 = 2H_2O + 2S$$

or under the high temperature and pressure present (2) $2H_2S + 3O_2 = 2H_2O + 2SO_2$
(3) Free sulfur (S)
$$O_2 + S = SO_2$$
(4) Mercaptans ($C_2H_5SH$)
$$2C_2H_5SH + 9O_2 = 4CO_2 + 6H_2O + 2SO_2$$
(5) Hydrocarbons ($CH_4$ for example)
$$CH_4 + 2O_2 = CO_2 + 2H_2O$$

The heat and pressure also act to reduce the ferric iron to the ferrous state and proportionately increase its oxidizing action. The catalytic action of the chlorides assists the above reactions by reacting with the hydrogen sulphide thus:—

(6) $2FeCl_3 + H_2S = 2FeCl_2 + 2HCl + S$.

From tower 21 the carbon dioxide gas, with the sulfur dioxide, moisture, hydrochloric and sulphurous acids etc. from the reactions in tower 21, flows at reduced pressure and temperature into tower 22 where the acids are neutralized by the sodium carbonate and the sulfur dioxide is eliminated by the following reactions:—

$H_2O + SO_2 = H_2SO_3$
$H_2SO_3 + Na_2CO_3 = Na_2SO_3 + H_2CO_3$
$H_2CO_3 = H_2O + CO_2$ also
$H_2CO_3 + Na_2CO_3 = 2NaHCO_3$
$2NaHCO_3 + SO_2 = Na_2SO_3 + H_2O + 2CO_2$ and if enough $SO_2$ is produced the following will take place:—

$Na_2SO_3 + H_2SO_3 = 2NaHSO_3$

The use of the coated granules in tower 22 overcomes all of the disadvantages of employing soda in solution or as a body of dry soda. The former is objectionable as it is prone to blow back into tower 21 during stoppages and also because it produces a moisture laden gas which must be dehydrated before condensing. The use of a body of dry soda is objectionable since caking from the gas moisture causes channel flows and ineffectual contact.

The coated granules separate the gas into an infinite number of infinitely small streams each of which is brought into intimate and continuous contact with the sodium carbonate.

The gas flowing from tower 22 should be completely purified, however, the tower 23 is provided principally as a safety feature to remove any remaining contamination which may have escaped removal in tower 21. Tower 23 is preferably filled with the granular oxidizing agent of tower 21. It could, however, contain other reagents such as sodium carbonate and alum, coated as before on alumina, bauxite or silica jell granules, or it may contain any other absorbent such as charcoal, if desired.

From the final purification in tower 23 carbon dioxide flows through pipe 28 to the condenser 24, thence through the filter 25 to the final discharge valve 35. Because of its expansion in the towers 23 and condensation in condenser 24 the carbon dioxide has been reduced to a liquid state by the time it reaches the filter 25. After filtering it is ready for any desired commercial use. It may be stored in liquid bottles for beverage carbonation or expanded into snow crystals for the manufacture of solid carbon dioxide for refrigerating purposes.

The air can be renewed in the towers as often as necessary by manipulation of the valves 32, 33, 29 and 34 so as to maintain the oxidizing agent at its maximum efficiency. The reagent in tower 22 may be reactivated by discharging the granules into an open pan in which they may be heated and stirred to eliminate the impurities collected in tower 22.

The number of towers employed is of course optional, depending upon the quantity of gas being treated and upon the degree of purity desired.

While preferred forms of the invention have been described in some detail together with the theories which it is believed to best explain its success, it is to be understood that the invention is not limited to the precise procedure described nor is dependent upon the accuracy of the theories which have been advanced. On the contrary, the invention is not to be regarded as limited except in so far as such limitations are included within the terms of the accompanying claims in which it is the intention to claim all novelty inherent in the invention as broadly as is permissible in view of the prior art.

Having thus described the invention, what is claimed and desired secured by Letters Patent is:—

1. The process of removing oxidizable impurities from carbon dioxide gas comprising: subjecting said gas under the influence of heat above the reaction temperature to the action of a porous oxidizing agent of a type to convert the said impurities to an easily oxidizable state, the pores of said oxidizing agent being filled with air under pressure for completing the oxidation.

2. The process of removing oxidizable impurities from carbon dioxide gas comprising: heating said gas above the reaction temperature; thence passing said hot gas through a dried mixture of ferric oxide, ferric chloride and aluminum chloride in the presence of air.

3. The process of removing oxidizable impurities from carbon dioxide gas comprising: heating said gas; passing said hot gas in the presence of air through a dried mixture of ferric oxide, ferric chloride, aluminum oxide, and aluminum chloride under the influence of sufficient heat and pressure to convert the ferric iron to the ferrous state.

4. The process of removing oxidizable impurities from carbon dioxide gas comprising: heating said gas; thence passing said hot gas through a dried mixture of ferric oxide, ferric chloride, activated alumina and aluminum chloride in the presence of air.

5. A medium for the purification of carbon dioxide comprising: a dried paste of ferric oxide, ferric chloride, activated alumina and aluminum chloride.

6. A method of preparing a medium for the purification of carbon dioxide comprising: forming a thick paste of ferric oxide, ferric chloride, activated alumina, and aluminum chloride; drying said paste; and granulating the dried paste.

7. The process of purifying carbon dioxide gas comprising: heating said gas to a temperature ranging from 200° to 450° F.; passing said heated gas under a relatively high pressure through a porous oxidizing agent containing occluded air under pressure; thence passing said gas through a granular mass of inert granules, the surfaces of which are coated with sodium carbonate.

8. A medium for the purification of carbon dioxide comprising: a dried paste of ferric oxide, ferric chloride, bauxite, and aluminum chloride.

9. The process of removing oxidizable impurities from $CO_2$ gas comprising: subjecting a porous oxidizing agent in a closed container to air under relatively high pressure; sealing said container so that the pressure of said air will be maintained in the pores of said agent heating said $CO_2$ gas to an oxidizable temperature; and thence forcing said heated $CO_2$ gas at still higher pressure into said agent under the influence of heat.

10. The process of removing oxidizable impurities from $CO_2$ gas comprising: passing air under pressure into a closed container containing a porous oxidizing agent; preventing escape of said air from said container until a relatively high pressure has been built up in said agent; sealing said container to retain the pressure in said agent; heating the $CO_2$ gas to an oxidizable temperature; thence passing said heated gas into agent at a pressure greater than the pressure of the air sealed therein.

11. The process of removing oxidizable impurities from $CO_2$ gas comprising: passing air at approximately 400 lbs. per square inch pressure into a closed container containing a porous oxidizing agent; sealing said container so as to maintain approximately the full pressure in said agent; heating said $CO_2$ gas to approximately 200° F. or more; thence passing said heated $CO_2$ gas into said agent at a pressure greater than 400 lbs. per square inch so as to trap the lesser pressure air in the pores of said agent.

FRANK GOODWIN.
E. AMBROSE WHITE.
HAMILTON PERKINS CADY.